(12) United States Patent
McMonagle et al.

(10) Patent No.: US 8,320,635 B2
(45) Date of Patent: Nov. 27, 2012

(54) METHOD AND SYSTEM TO CENTRALLY MONITOR THE QUALITY OF IMAGES OF FINANCIAL DOCUMENTS

(75) Inventors: Patrick S. McMonagle, Niwot, CO (US); Christine Collins, Pearland, TX (US); John Leon, Kingwood, TX (US)

(73) Assignee: Viewpointe Archive Services, LLC, Charlotte, NC (US)

( * ) Notice: Subject to any disclaimer, the term of this patent is extended or adjusted under 35 U.S.C. 154(b) by 1418 days.

(21) Appl. No.: 11/164,722

(22) Filed: Dec. 2, 2005

(65) Prior Publication Data

US 2007/0127782 A1 Jun. 7, 2007

(51) Int. Cl.
*G06K 9/00* (2006.01)
*G06K 9/54* (2006.01)
*G01B 5/28* (2006.01)
*G01B 5/30* (2006.01)

(52) U.S. Cl. ........ 382/112; 382/135; 382/137; 382/305; 702/35

(58) Field of Classification Search ................... 382/112, 382/135–140; 705/35
See application file for complete search history.

(56) References Cited

U.S. PATENT DOCUMENTS

| | | | | |
|---|---|---|---|---|
| 5,678,046 | A  * | 10/1997 | Cahill et al. | 707/200 |
| 5,930,778 | A | 7/1999 | Geer | |
| 7,283,656 | B2 * | 10/2007 | Blake et al. | 382/137 |
| 2003/0208421 | A1 | 11/2003 | Vicknair et al. | |
| 2005/0071283 | A1 * | 3/2005 | Randle et al. | 705/75 |
| 2005/0108157 | A1 * | 5/2005 | Bushman et al. | 705/40 |
| 2006/0118613 | A1 * | 6/2006 | McMann et al. | 235/379 |
| 2006/0182331 | A1 * | 8/2006 | Gilson et al. | 382/137 |
| 2007/0053574 | A1 * | 3/2007 | Verma et al. | 382/137 |

* cited by examiner

*Primary Examiner* — Randolph I Chu
(74) *Attorney, Agent, or Firm* — Steven B. Phillips; Moore & Van Allen PLLC

(57) ABSTRACT

Method and system to centrally monitor the quality of images of financial documents. Embodiments of the present invention can provide a way to monitor and evaluate the quality of images of financial documents stored for remote access by financial institutions. In some embodiments, a standard quality analysis of at least some of the images is performed, and, based on the quality analysis, suspect images are identified to a responsible entity. For at least some of the images, a decisioning result from the responsible entity is recorded in association with information identifying the images. The quality analysis can be applied based on exclusion criteria such as an amount threshold, certain routing information, etc. The suspect images can be identified by sending a quality results file to the responsible entity, and a decisioning result can be received in a decisioning results file.

28 Claims, 7 Drawing Sheets

METHOD AND SYSTEM TO CENTRALLY MONITOR THE QUALITY OF IMAGES OF FINANCIAL DOCUMENTS

BACKGROUND

Financial Institutions have established various processes and associations related to the exchange of documents evidencing monetary transactions. Some types of financial documents have been historically encoded with magnetic ink so that information from the documents can be read by machine. Such documents have thus become known as magnetic ink character recognition (MICR) documents. Historically, these documents have been at least theoretically presented for payment by delivery of physical paper. However, many types of payments and transactions are no longer enabled by paper. Additionally, reconciliation and error recovery based on paper documents is subject to numerous exceptions as a result of paper handling and due to late delivery of documents. Thus, legislation has been promulgated which allows banks to completely eliminate paper documents and accomplish presentment and other processes using electronic images of checks and other documents.

In the United States for example, this legislation is referred to as "The Check Clearing for the $21^{st}$ Century Act" or simply "Check 21" and authorizes the use of electronic records for presentment from one bank to another as long as the images in the electronic records accurately represent any original paper documents. Similar legislation may exist in other countries. Prior to legislation such as Check 21, when images of checks or other financial documents were used by financial institutions primarily to supply records to customers, or for archival purposes, the presence of image quality and/or usability problems had no serious ramifications for the check clearing process. However, with legislation such as Check 21 the use of large numbers of images in place of paper checks for presentment and clearing throughout the banking system demands that there be an efficient way to monitor image quality and/or usability. This need can be especially acute where large numbers of images may be stored, sent, and received at remote locations, possibly by clearing agents or contractors as opposed to the banks themselves.

SUMMARY

Embodiments of the present invention can provide a way to monitor and evaluate the quality of images of financial documents stored for remote access by financial institutions. In example embodiments, the invention also provides the capability for a centralized image storage facility to grant a responsible financial entity access to the images in order to make decisions based on the results of a quality analysis. Thus, when making use of an embodiment of the invention, a third-party image sharing vendor may be able to provide customer banks and financial institutions quality decisioning capability similar to what a bank itself would have if it were storing and processing images in-house.

In some embodiments, images are stored at a centralized storage facility that can typically be accessed by multiple financial institutions. A standard quality analysis of at least some of the images is performed, and, based on the quality analysis, suspect images are identified to a responsible entity. For at least some of the images, a decisioning result from the responsible entity is recorded in association with information identifying the images. In some embodiments, the quality analysis can be applied based on exclusion criteria such as an amount threshold, certain routing information, etc. In some embodiments, the suspect images are identified by sending a quality results file to the responsible entity, and a decisioning result is received in a decisioning results file.

In at least some embodiments, a system for quality monitoring includes a storage layer operable to store the plurality of images and to manage databases comprising information identifying the images. A process, which can be located in a business layer, identifies images as subject to an image quality analysis. An image quality analysis (IQA) system operatively connected to the process can be used to perform the image quality analysis and send and receive results files. These files can include quality and/or decisioning results, or both, as well as condition codes indicative of image quality. The files can also include information identifying each image, a global image quality indicator for each image, information identifying a paying and capture bank, and routing and amount information for each financial document.

In example embodiments, a computer program product that includes computer program instructions or computer program code can implement at least portions of the invention. These computer program code instructions can be embodied in computer usable media or transferred over a network, and control the operation of various servers, routers, network connections, and data stores and associated storage hardware to provide the means to carry out the invention.

BRIEF DESCRIPTION OF THE DRAWINGS

FIG. 1 is split into sheets 1A and 1B.

FIG. 2 is split into sheets 2A and 2B.

DETAILED DESCRIPTION

Figure 1A:
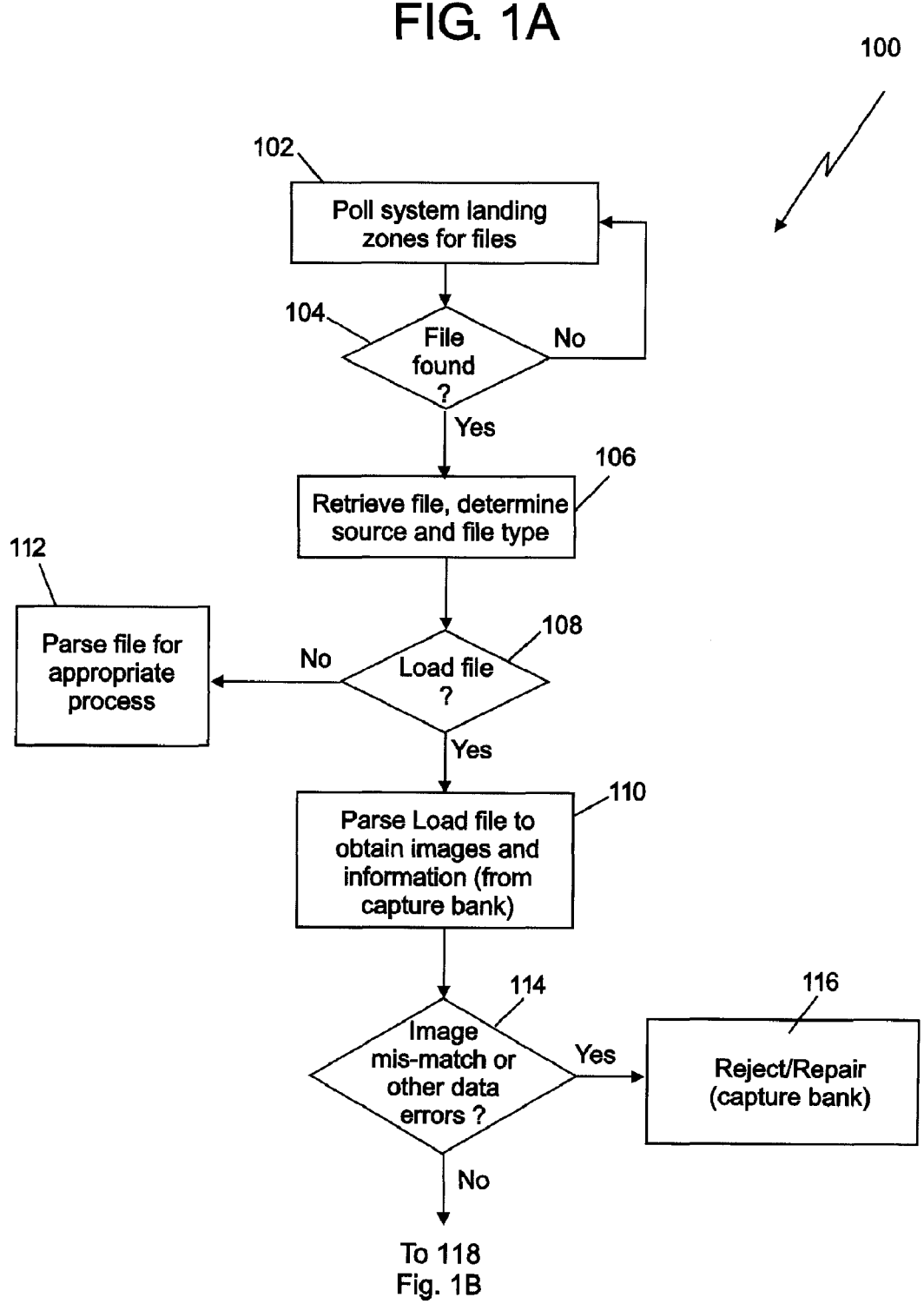
FIG. 1 is a flowchart that illustrates a method within a centralized check image storage facility according to example embodiments of the invention.

The present invention will now be described in terms of specific, example embodiments. It should be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention. It should also be understood that throughout this disclosure, where a process or method is shown or described, the steps of the method may be performed in any order or simultaneously, unless it is clear from the context that one step depends on another being performed first.

In at least some cases, the elements or steps shown in a particular drawing can co-exist with others shown in different drawings, but only certain elements or steps may be shown in each drawing for clarity. In some cases, additional elements or steps are discussed in detail in the text to more fully describe embodiments of the invention. It should also be understood that with respect to flowcharts, block diagrams, and data structures, not every possible signal flow, data path, or index element is shown. Rather, for clarity, only those important to the inventive concepts being discussed may be illustrated, although others may be discussed in this description.

The meaning of certain terms as used generally in the context of this disclosure should be understood as follows. The terms "financial document" or "check" can refer to any document evidencing a financial transaction. In this context, a "financial document" includes the typical check or draft, which orders a bank to pay a certain sum to the order of another individual or entity. Indeed, this is what is commonly thought of as a "check" by consumers and business persons alike. However, the terms "financial document" or "check" can also include other documents evidencing financial transactions related to banking. For example, in the context of this disclosure, a deposit, adjustment, or similar document that evidences a change to an account can also be included.

The terms "capture bank" and "paying bank" as used herein refer to the two banks that are typically involved in financial transactions, for example, the processing of checks. The "capture bank" is typically the bank that first captures an image of a completed check. In most cases, this is the bank where a check is deposited for payment, and might also be referred to in traditional commercial paper parlance as the "depositary bank" or the "collecting bank." The "paying bank" is the bank that owns the account to which the check pertains, in the case of a draft, typically, the bank in which the funds to pay the draft reside. This is typically the bank where a check writer has an account. However, the invention can be applied between any financial institutions that desire to share images captured by one of the institutions. Information is exchanged that supports the check clearing process, so that the institutions can, if they so desire, implement an electronic check collection or clearing process and truncate paper checks, although check truncation is not required to implement the invention. Thus, the terms "capture bank" and "paying bank" are used herein only in the context of example embodiments. Note that even the term "bank" is used herein in its broadest sense. Financial institutions that process transactions of the type discussed can include stock brokerages and other types of institutions that are not strictly "banks" in the historical sense. The use of the term "bank" herein is meant to encompass such possibilities. The term "entity" is also used. This term can refer to any party that reviews quality results and makes decision based on those results. This will often be a bank or financial institution, but could be a retail establishment, non-profit organization, individual, etc.

In traditional banking, a check is presented to the paying bank for payment. It should be noted that in some circumstances, the capture bank and the paying bank might be the same bank. For example, the check process might be carried out between different branches, divisions, facilities, etc., of the same financial institution. The terms paying bank and capture bank are intended to encompass this possibility.

The example embodiments presented herein are illustrated in the context of a centralized check image storage facility that can be accessed by multiple entities. Such a facility is described in detail in commonly owned, U.S. patent application Ser. No. 10/711,550, entitled "Centralized Check Image Storage System," filed Sep. 24, 2004, the entire disclosure of which is incorporated herein by reference. It cannot be over-emphasized that the system described in this reference is presented as an example only, and the image quality techniques presented herein could be implemented in many types of systems by persons of ordinary skill in the art.

There are several file formats and file formatting standards that may be relevant to the methods and systems described herein. These file types, with the exception of the "DIFOUT" and "QROUT" files described in detail in this disclosure, are intended to refer to industry standards that are well known in the banking technology arts. Thus, detailed explanations are not required. As an example, the "mixed object document content architecture" (MOD:CA, or simply "MODCA") is a standard file format which was originally developed by and used for data processing systems produced by the International Business Machines Corporation. This format has been used for years to provide data to large scale printers. With MODCA format, image information is stored in an "out file" and information to identify the image information is stored in an "index file". This format has been well known in the information technology industry and will not be discussed in an exacting level of detail.

It should be understood that these file formats and image standards are disclosed by way of example embodiments of the invention. One of ordinary skill in the art could readily develop a system based on different standards and formats, but that would not depart from the spirit and scope of the claims appended to this disclosure. Examples of other formats that may be used for purposes of embodiments of the invention include, but are not limited to, TIFF (tagged image file format), and ANSI X9.37 format.

The meaning of the term "quality" as it is applied herein to images should be well understood. This term can certainly take on its generic, dictionary meaning within the scope of this disclosure. However, it is also intended to encompass what in the financial industry is referred to as image "usability" and in some cases may include both quality and usability. Efficient and secure image-based item processing relies on high-quality images for a wide range of solutions, from recognition and data entry, to balancing, research and adjustments. Check 21 does not actually mandate a specific image quality level, but rather creates "usability standards" by mandating that substitute checks be usable for the intended purpose. At least some off-the-shelf image quality analysis products include the capability to examine up to twelve fields on a check that are potentially of interest as defined in the ANSI X9.37 standard. Image usability analysis ensures that important data items on a check are usable for the intended purpose. The overall image quality may be good, but particular information on a document may not be suitable. Again, the use herein of the term "quality" as in image quality analysis is meant to encompass quality, usability, and/or combinations of the two.

Figure 1B:
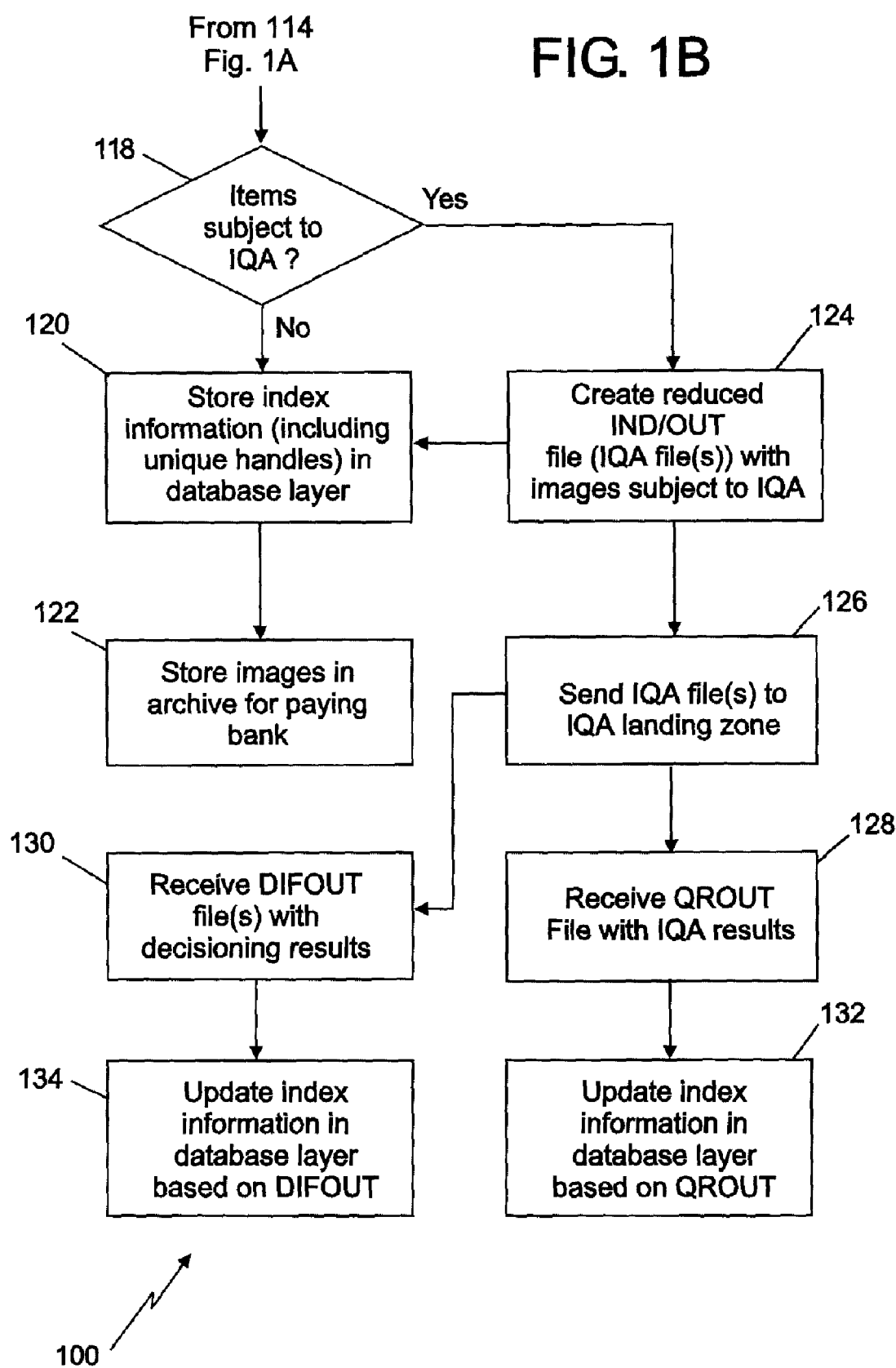

FIG. 1 is a flowchart which illustrates methods and processes according to some embodiments of the present invention. FIG. 1 is illustrated on two sheets as FIG. 1A and FIG. 1B. FIG. 1, in typical flowchart form, shows process 100 as including various process blocks. At block 102, landing zones for various banks are polled for files. These landing zones are referred to as system landing zones to distinguish them from the IQA landing zone discussed with respect to FIGS. 2 and 3. A landing zone is an area of storage, typically behind a firewall, into which an entity, such as a bank, can deposit a file for processing by a storage system according to the invention. In some embodiments, a landing zone can be used for a bank to pick up files as well. Additional detail on implementing a system landing zone will be discussed below. At block 104, processing branches when a file is found. Until a file is found, processing continues with polling of the system landing zones. When a file is found, processing moves to block 106, where the file is retrieved, the source is determined, and a file type is determined.

Block 108 represents a decision point where the type of processing that occurs depends on the type of file found. If the file is found to be a "load file", for example, from a capture bank, it will normally contain images and information. The load file is parsed at block 110 to obtain the images and the information identifying the images. Some of this information may also support the check collection/clearing process. If the file found is determined at block 108 to be some other type of file, processing branches to block 112, where the file or files can be parsed for the appropriate process. If the file is a load file, a determination is made at block 114 as to whether the file has errors. This determination involves verifying the index information with the images present. Images that are missing, corrupt, or misidentified, are repaired at exception process block 116. The exception process can involve communicating with the capture bank or other entity to correct the information in the load file. If necessary, the sender or owner of the file can correct the errors and regenerate the load file.

At block 118, a decision is made as to whether the images in the load file generally are subject to the image quality analysis (IQA) process. This decision is usually based on whether the entity that is to eventually receive the images (such as a paying bank) is set up to make use of the IQA process. If not, processing proceeds to block 120, where index information, and possibly other information supporting the check clearing process, is stored in a database layer. The images are stored in an archive for later retrieval (in example embodiments, by a paying bank) at block 122. In this embodiment, the index information can be stored in a database layer, such as a "DB2" database layer, which operates on conventional database principles. Images can be stored in an image archive. It should be noted that in example embodiments, the images and information, prior to being parsed for storage at blocks 120 and 122, are contained in MODCA index and out files, collectively referred to as an "IND/OUT" file combination, or simply an "IND/OUT" file. However, a load file can be any file or combination of files that stores both images and information about the images.

Returning to decision point 118 in FIG. 1, if at least some items in the load file in question are subject to the IQA process, processing branches in this example embodiment to block 124 where an IND/OUT file is created for the IQA process. Such a file may be referred to herein for convenience as an IQA file. In many cases, this file will be a "reduced" file, in that it contains only a subset of items in the original load file, such as items that meet certain general criteria which an entity making use of the process had specified.

At this point, it would be beneficial to discuss a convention used throughout the flowcharts presented in this disclosure. Where an overall process branches from a process block such as block 124 in two directions, this indicates that two process branches are initiated at that process block, and that the sub-processes in those two branches can occur asynchronously, with each branch being followed simultaneously, but independently. Thus, after the IQA files are created at block 124, the index information and images are stored at blocks 120 and 122 as before, and in addition, the IQA files are sent to an IQA subsystem landing zone at block 126.

Still referring to FIG. 1, at block 126, the centralized image storage system simultaneously looks for a quality results file, referred to herein as a "QROUT" file to be returned from the IQA subsystem at block 128, and a decisioning results file, referred to herein as a "DIFOUT" file to arrive with decisioning results from a responsible entity at block 130. In either case, the index information in the database layer is updated in accordance with the contents of the appropriate results file, at blocks 132 and 134, respectively.

Figure 2A:
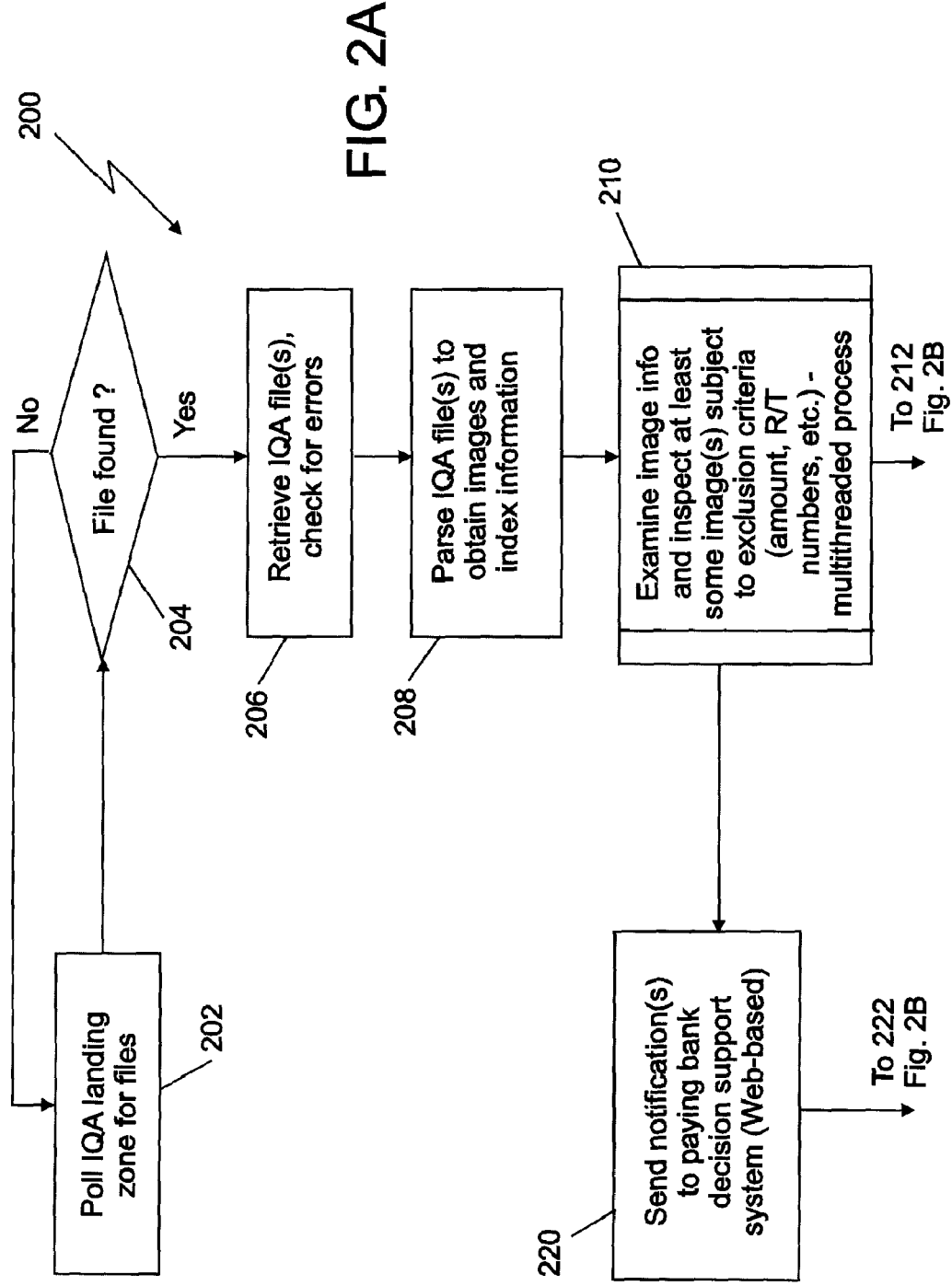
FIG. 2 is a flowchart that illustrates a method within an image quality analysis (IQA) system according to example embodiments of the invention.
Figure 2B:
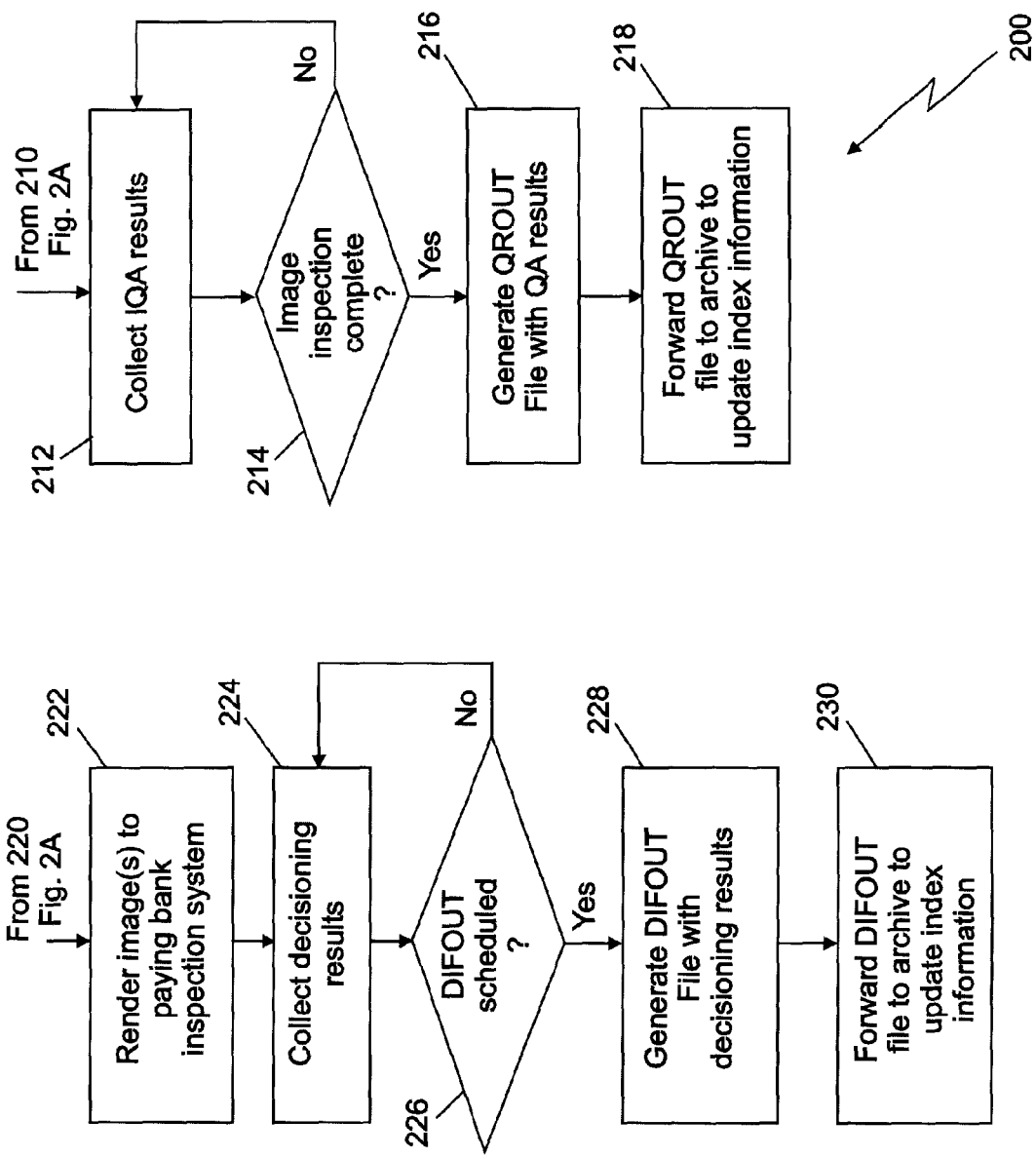

FIG. 2 is another flowchart style diagram in which various sub-processes are illustrated as a series of process blocks. FIG. 2 is illustrated on two sheets as FIG. 2A and FIG. 2B. Process 200 of FIG. 2 is essentially the quality monitoring process as seen from the point of view of an IQA subsystem. Process 200 begins at block 202 where the IQA landing zone is poled for files. At block 204, processing branches when a file is found in the IQA landing zone. Until a file is found, processing continues with polling the IQA landing zone. When a file is found, processing moves to block 206, where the file is retrieved, the source is determined, and the file is checked for errors. At block 208, the IQA file is parsed to obtain images and information.

Still referring to FIG. 2, block 210 represents a multi-threaded process in which individual images are inspected based on image information supplied. This inspection process is carried out using a standard image quality software algorithm, as is known in the art. This inspection process may be subject to specific, item by item exclusion criteria. The exclusion criteria in 210 may include items such as a threshold amount, specific routing and transit numbers, specific payees or payers, etc. The exclusion criteria can be generally based on business rules and applied on an item by item basis in the example embodiment, as opposed to the more generalized criteria applied in the process of FIG. 1 to generate a reduced IND/OUT file for the IQA process. Quality inspection algorithms suitable for use with embodiments of the present invention include those which inspect scanned images for image skew, contrast and brightness, streaks and bands, image size, etc. Note that multi-threaded process 210 branches in two directions, indicating that the branches for each direction, although initiated at process block 210, can occur asynchronously, with each branch being followed simultaneously, but independently.

The quality analysis branch of process 200 continues with block 212, where quality analysis results are collected. At block 214 a determination is made as to whether the image inspection process of block 210 is complete. If not, results continue to be collected at block 210. Otherwise, a QROUT file which contains the results of the quality analysis is generated at block 216. The QROUT file is then forwarded to the central database so that the index information there can be updated in accordance with the contents of the QROUT file. The nature and format of the QROUT file will be discussed below with respect to FIG. 4.

The decisioning branch of process 200 picks up from block 210 at block 220. At block 220, in this embodiment, notifications of images with quality issues are sent to the paying bank or other responsible entity via a decision support system. In many cases, this decision support system will be Web-based. In this example embodiment, notifications are sent as images are inspected; the system does not wait until all images are inspected before sending notifications. A standard, off the shelf, decision support system can be used for receiving the notifications and notifying the centralized storage facility of quality decisions made by the responsible entity. Additionally, a standard work flow management package can readily be adapted to keep track of the decisioning process. At block 222 in this example, upon request by the responsible entity, images are rendered to an inspection system which allows a remote operator to view each suspect image. Again, standard image viewing and rendering software can be used for this part of process 200. Decision results for each image are collected at block 224.

Still referring to FIG. 2, the process branches at block 226 based on whether or not a decisioning results file, called a DIFOUT file in this embodiment, is to be created, documenting acceptance decisions made thus far by the responsible entity. In some embodiments, a DIFOUT file is created at regular intervals, so that this decisioning point would be based on time, for example, a file might be created every hour. In other embodiments, a DIFOUT file might be created only when all of the decisioning is completed for a particular batch of images. In any case, if a results file is not to be created at this time, processing branches back to block 224. Otherwise, processing branches to block 228 where the DIFOUT file containing decisioning results is created. At block 230, that file is sent to the central storage facility so that the appropriate index information can be updated with the decisioning results. For a particular batch of images, the process ends when all of the decisioning results have been reported back from the responsible entity to the centralized storage facility. However, in practice, it is anticipated that the quality monitoring and decisioning processes described herein would be ongoing as images are processed over time.

Figure 3:
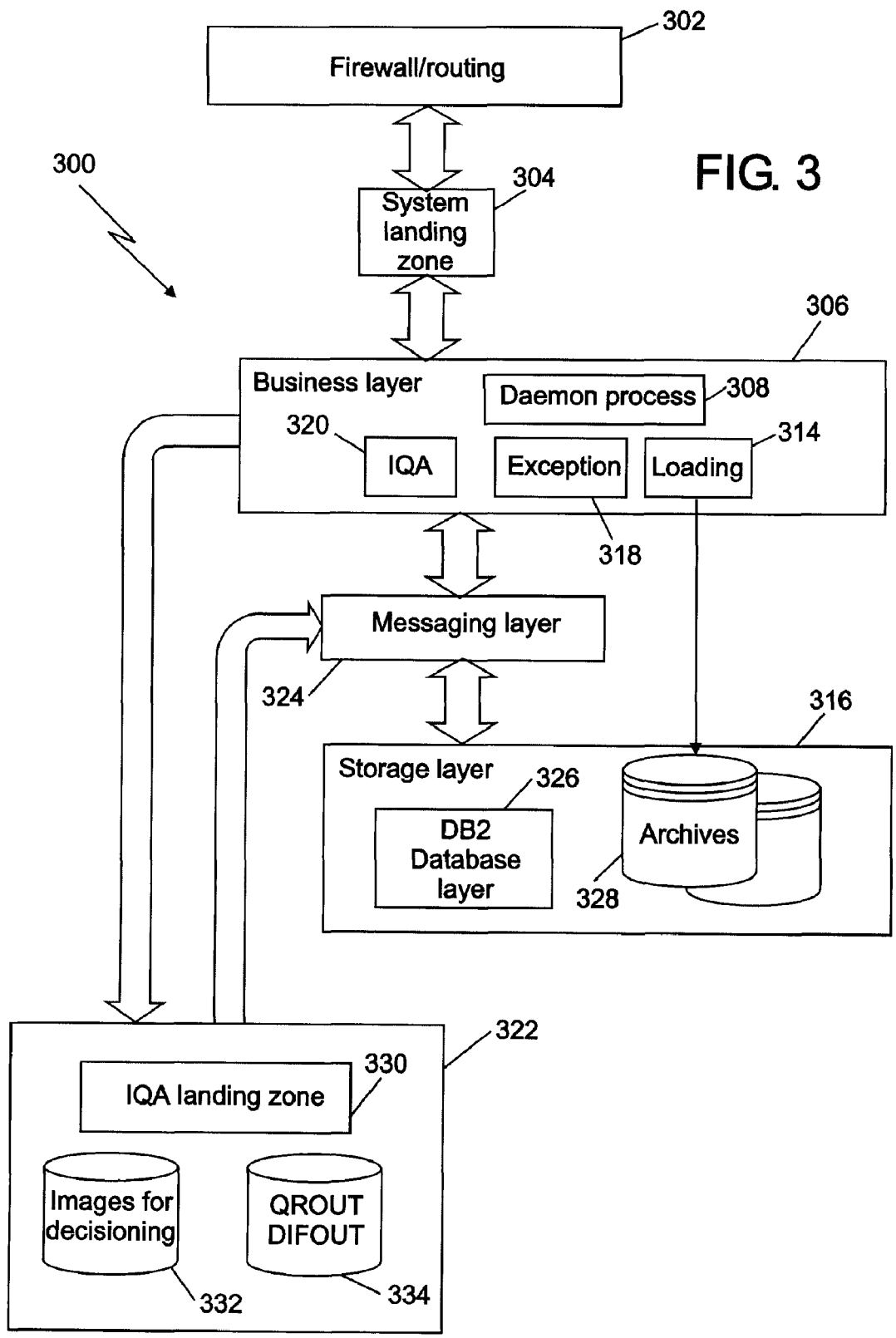
FIG. 3 is a system block diagram that illustrates a software and system architecture for implementing some example embodiments of the invention.

FIG. 3 is a block diagram of a system, 300, which can be used to implement at least some embodiments of the processes described in FIGS. 1 and 2. In system 300, all of the various parts of the system are located behind a firewall and routing functions, shown at block 302. In example embodiments, routing is conducted over the Internet. More specifically, connections to paying and capture banks or other entities are made over "virtual private network" (VPN) facilities, including typical encryption routines as are known in the art. VPN processing is well known to those of skill in the data processing arts, and so will not be discussed in great detail. Block 304 is a landing zone onto which, or into which, entities such as banks may deposit files for processing.

In the example of FIG. 3, business layer 306 performs various services involved with implementing core functionality of system 300. Daemon process 308 polls landing zone 304 for the various file types. Daemon process 308 invokes parsing processes, which are used to parse the various files. The parsing processes can call merging component to verify image details and direct loading process 314 to load images into a storage layer, 316. Business layer 306 also includes the exception process, 318, and an image retrieval process. IQA management process 320 identifies files and images for the IQA subsystem, 322, and manages communications with the IQA subsystem.

System 300 of FIG. 3 includes messaging layer 324. The messaging layer helps all of the other modules, processes, and objects in the system communicate with each other. Messaging layer 324 can also temporarily store event and status information. In some embodiments, every other module and process in a system can send notification messages through a messaging layer to other components within the system.

Storage layer 316 of FIG. 3 has been previously mentioned. In this embodiment, storage layer 316 includes database layer 326. Database layer 326 can include various databases. In this example, it includes an information interchange (II) database. This database contains index information for the images, and other files needed to identify images to be shared between entities. Database layer 326 can also include a profiling database to define specific operating parameters for a bank or other entity using the facility. Other profiling data can also be contained in the profiling database to define how the archives, discussed below, operate when errors are detected, the location of landing zones and work areas, and the specifics for loading data into folders for the paying banks, as described below.

Still referring to FIG. 3, database layer 326 also includes a billing database, and other databases that may be needed for the system to operate. The billing database can be used to maintain information by which customer entities can be billed for image sharing and IQA services. In this example, database layer 326 can be implemented using "DB2" database technology, which is well known to those of ordinary skill in the data processing arts. Storage layer 316, in the example of FIG. 3, includes an "OnDemand" archive or archives, 328. "OnDemand" refers to a well-known archiving solution available from the IBM Corporation referred to as Content Management OnDemand (™). The OnDemand archive, 328, can include a transit folder, an "on us" folder, and an exchange zone for image sharing. Note that in this example, loading process 314 loads the images into the OnDemand archive 328.

As previously mentioned the Daemon process 308 of FIG. 3 polls for and locates files in system landing zone 304. After a file is located, it is moved to a processing area and the Daemon process, 308, initiates an appropriate parser which runs as part of one or more parsing processes. After parsing, necessary file details are inserted into the II database in database layer 326. In some embodiments, the II database contains indexed field values for index detail records separated by delimiters. Loading process 314 creates generic index files for loading into the folders in OnDemand archive 328. Files can be stored in the archive in some embodiments, in a MODCA format.

Referring again to FIG. 3, system 300 includes IQA subsystem 322. The IQA subsystem, in the example embodiments discussed here, includes its own landing zone, IQA landing zone 330. It also includes storage 332 for images that are involved in the IQA process and need to be decisioned, as well as temporary file storage, 334. This temporary file storage can be used to store the QROUT and DIFOUT results files. It should be noted that although in this embodiment, the IQA process itself is handled by a separate subsystem, which may be operating on separate hardware, this it but an example only. All of system 300 could be implemented by any combination of hardware and software that performs the appropriate functions. System 300 may include multiple processors, storage system and networks, or it may all be implemented on a single workstation or other type of computer system.

The landing zones discussed above can be implemented by file transfer protocol (FTP). Secure file transfer protocol would typically be used for at least the system landing zone and possible for the IQA landing zone if external entities will have access to it, for example, to retrieve images for decisioning and deposit DIFOUT files. In example embodiments, one or both landing zones can be implemented by any known product that provides a way in which secured access can be obtained by authorized parties to storage space behind a firewall.

Figure 4:
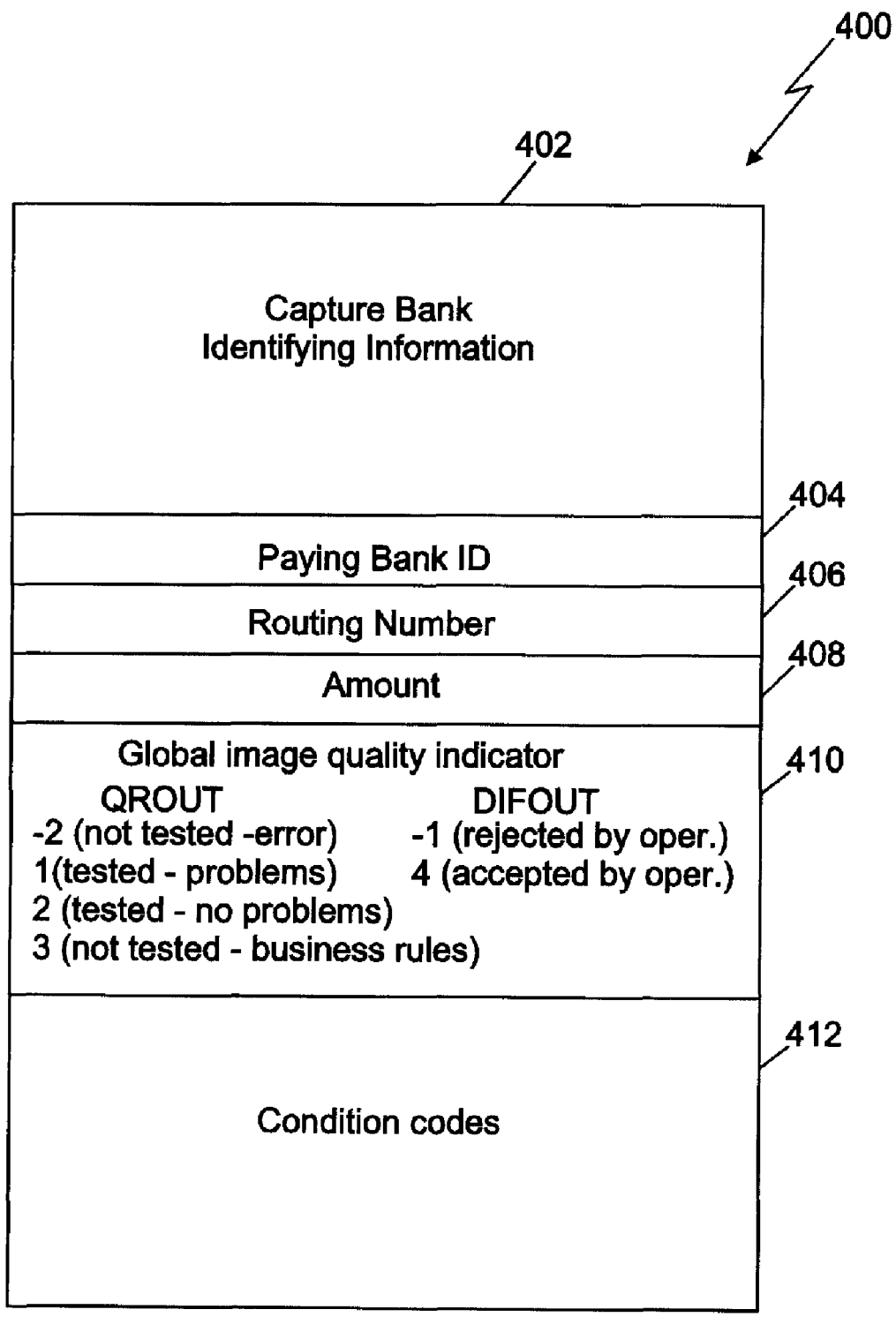
FIG. 4 is a data structure diagram that schematically illustrates an image record from a results file according to example embodiments of the invention.

FIG. 4 provides a schematic illustration of a portion of the structure of both the DIFOUT and QROUT results files according to example embodiments of the invention. FIG. 4 illustrates a single record, 400, from within one of the files. In example embodiments, each file would contain multiple records of this type, one for each image. In example embodiments, the files maybe, delimited text files. Record 400 includes capture bank identifying information 402. This identifying information may include, for example, a capture bank identifier assigned to the capture bank by the centralized storage facility. It may also include the capture bank capture date, and the capture bank sequence number. Record 400 may also include field 404 for the paying bank identifier, which can also be assigned by the archive facility. In this example embodiment, record 400 also includes field 406 for the routing number of the item in the image, and field 408 for the amount of the item in the image. Field 410 is for a global image quality indicator, which has different possible values and a different meaning depending on whether the record is part of a QROUT file or a DIFOUT file.

In this example embodiment, global image quality indicator 410 of FIG. 4 can take on four different values if the record is part of a QROUT file which contains quality analysis results. A value of −2 indicates that the particular image was not tested due to an error. A value of 1 indicates that the image was tested and problems were found. A value of 2 indicates that the image was tested and no problems were found. Finally, a value of 3 indicates that the image was not tested due to business rules. Business rules specify the exceptions that are used to except specific images from quality analysis as discussed with respect to FIG. 2.

Still referring to FIG. 4, global image quality indicator 410 can take on 2 values in this example embodiment when the record is part of a DIFOUT file, which specifies decisioning results. In this case, global image quality indicator can take on a value of −1 if the image was rejected by an operator, or 4 if the image was accepted by an operator. Note that the type of file to which the record belongs can be readily identified by the global image quality indicator. Since the possible values for the two types of files do not overlap, the value contained in the global image quality indicator field will uniquely specify one type of file or the other.

Fields 412 of record 400 of FIG. 4 include condition codes for various image conditions which can be checked by image quality analysis routines. Condition codes 412 in some embodiments include multiple fields, one field for each code. These condition codes in the example embodiment are contained in both the QROUT and DIFOUT files. A system can be set up by one of ordinary skill in the art to test for any or all of various image conditions. Which conditions are tested for in a particular system may depend on the particular software being employed or how the images are being used in particular case. In the example embodiments disclosed herein, each condition code can take on a value of 0 to indicate a test for that condition was not done, 1 to indicate that the condition is present, and 2 to indicate that the condition is not present.

The following discussion is an illustrative example of types of conditions that might be checked for by off the shelf image quality analysis software. This list is an example only, and software could be developed that checks for additional conditions, or does not check for all of these conditions. Additionally, some conditions may be combined into a single condition. For example, the minimum image size and the maximum image size conditions could be combined into a condition for image size exception.

In example embodiments, conditions checked for include a partial image, which identifies a section of missing or corrupt information. This type of analysis involves splitting the images into areas, each of which should contain identified zones. The reported condition code is based a percentage of areas that contain identified zones. Excessive image skew is a measurement of the angle of the image. Skew is defined as the angle of horizontal lines when compared to a horizontal plane. This condition test can be accomplished by analyzing the lines of text in the body of an item. An angle of more than an identified number of degrees will generally be unacceptable. A piggy-back image condition is a measure of likely it is that the image file is composed of two or more check images that are in some manner layered over each other and transmitted as a single image. In example embodiments, this condition is identified by detection of vertical lines across the whole of the image.

Some condition codes are related to the settings or condition of the image capture equipment. For example, a lightness and darkness condition code is based on a percentage of black and white that should be within a pre-defined range. A test for this condition is typically only applied to key data carrying zones of an item to avoid the prospect that checks stocks using larger complex logos might cause a false trigger. A test for streaks or bands is applied to test for problems caused by dirt on the imaging lens. A test for this condition can also determine if a check has been damaged by stains, overprinting, or the like. Again, this condition is typically applied only to the aforementioned zones of an image.

The following conditions relate to validating the image data. In the example embodiments, a test is made to determine if the image is below a minimum image size relative to the pixels, resolution, and the expected size of a business or personal check. A test for a similar condition of whether the image exceeds a maximum image size can also be done.

Finally, note that the validity of fields containing data read from a check can also be examined as an indication of quality and/or usability, as discussed earlier. In fact, it should be noted that there could easily be embodiments of the invention that perform only this type of image quality analysis function, as many of the other types of conditions could be checked by image capture equipment. As an example, consider that MICR line validation can be done to validate the index data with check image MICR lines containing routing and transit numbers. Such a validation can be accomplished, for example, by using an image character recognition routine to validate stored MICR data against the MICR line in a check image. A possible usability problem would be indicated, for example, if the two versions of the routing/transit number do not appear to match.

Figure 5:
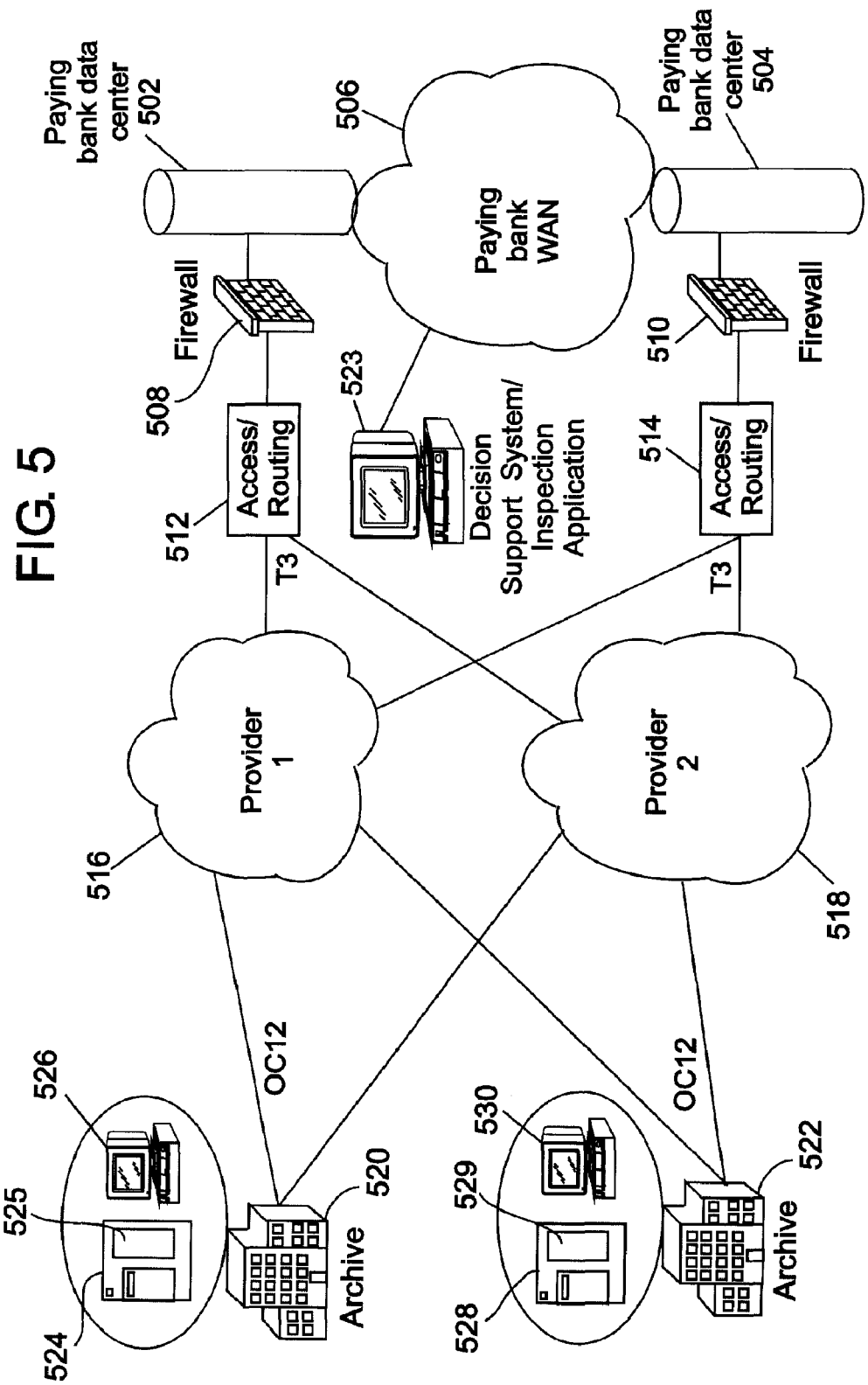
FIG. 5 is a network block diagram showing an example operating environment for at least some embodiments of the invention.

FIG. 5 illustrates a typical operating environment for a centralized storage system including the quality analysis and monitoring techniques according to example embodiments of the invention. Again, the system of FIG. 5 is an example only. At one end of FIG. 5 are the facilities of an enterprise such as a financial institution, in this specific example, a paying bank. In an actual network, multiple customer institutions access the centralized storage system over the networks using similar data centers and connections. Only one customer paying bank facility is shown in FIG. 5 for clarity. Due to the mission critical nature of the data processing and imaging facilities at a financial institution, most such enterprises use redundant data centers. In the example of FIG. 5, data centers 502 and 504 are interconnected via a paying bank wide area network (WAN), 506. Each data center, 502 and 504, has access to external networks via firewalls, 508 and 510, and access and routing hardware, 512 and 514, as is known in the art. Paying bank data center network access is provided via T3 connections in this example. Due to the previously mentioned mission critical nature of financial institution networking and data processing services, banks may be connected to the centralized storage system via redundant provider networks, 516 and 518. These networks in this example are operated by "Provider 1" and "Provider 2," respectively. Both networks 516 and 518 can use the resources of the Internet for connectivity. However, each one will provide its own VPN connection or "pipe" to the bank data centers, 502 and 504. Typically, highly secure encryption such as so-called "triple DES" encryption will be used at access and egress levels for the networks.

A centralized storage and quality monitoring system according to some embodiments of the invention can include two or more physical storage locations, such as storage locations 520 and 522. Since in a typical environment, these locations will be serving many responsible entities, faster optical carrier connections can be used to interface the locations to a network. In the example of FIG. 5, optical carrier 12 (OC12) connections are used. Any other type of high-volume, high speed connection can be used, for example, OC48 or OC192 connections. In any case, a centralized system according to embodiments of the invention will include all of the computer systems, local networking hardware, storage devices, etc. to form the means to carry out the processes involved in providing images to banks and monitoring, analyzing, and tracking image quality, including the provision for decisioning by the banks. Inspection of images and quality decisioning regarding those images is enabled at the paying bank by system 523, which is a workstation or other type of computer system that runs an image inspection application and the decision support system previously discussed.

As previously mentioned, computer program instructions may be used to implement all or parts of the present invention. In a typical arrangement, computer program instructions running on various computing or instruction execution platforms within locations 520 and 522 of FIG. 5 will carry out the various operations required to implement processes according to embodiments of the invention. These computer program instructions may be part of a computer program or multiple computer programs which are supplied as a computer program product. In such a case, the computer program product may take the form of computer readable media that allow computer program instructions to be loaded into various servers or other computing platforms to implement the invention. In the example operating environment of FIG. 5, a computer program product in the form of a medium containing the appropriate computer program instructions is shown as medium 524 containing instructions 525 which are then loaded onto server 526 residing at location 520. Similar computer program instructions which implement embodiments of the invention reside on medium 528 containing instructions 529 which is then loaded onto server 530 which resides at location 522.

Computer programs which implement embodiments of the invention can reside on any medium for use by or in connection with any instruction execution system, apparatus, or device. The medium may be for example but not limited to, an electronic, magnetic, optical, or semiconductor system or device. Such media include compact disk, read only memory (CD-ROM), and digital versatile disk read only memory (DVD-ROM).

Specific embodiments of an invention are described herein. One of ordinary skill in the computing, networking, and financial information technology arts will quickly recognize that the invention has other applications and other environments. In fact, many embodiments and implementations are possible. The following claims are in no way intended to limit the scope of the invention to the specific embodiments described above.

What is claimed is:

1. A computer implemented method of monitoring quality for images of financial documents, the method comprising:
    storing the images in a storage device at an image sharing vendor;
    performing, in a computer system at the image sharing vendor, a quality analysis of at least some of the images;
    identifying suspect images to a responsible customer bank over a network, the identifying being accomplished by the computer system at the image sharing vendor based on results of the quality analysis; and
    recording in the storage device at the image sharing vendor, for at least some of the images, a quality decisioning result received from the responsible customer bank over the network, the quality decisioning result being recorded in association with information identifying the images wherein the quality decisioning result is based on the result of the quality analysis.

2. The method of claim 1 further comprising applying by the computer system at the image sharing vendor exclusion criteria to the images to select the at least some of the images for the quality analysis.

3. The method of claim 1 wherein the identifying of the suspect images further comprises sending a quality results file to the responsible customer bank over the network.

4. The method of claim 3 further comprising receiving a decisioning results file from the responsible customer bank over the network, the decisioning results file further comprising the quality decisioning result.

5. The method of claim 2 wherein the identifying of the suspect images further comprises sending a quality results file to the responsible customer bank over the network.

6. The method of claim 5 further comprising receiving a decisioning results file from the responsible customer bank over the network, the decisioning results file further comprising the quality decisioning result.

7. The method of claim 4 wherein at least one of the quality results file and the decisioning results file further comprises a plurality of condition codes indicative of image quality.

8. The method of claim 6 wherein at least one of the quality results file and the decisioning results file further comprises a plurality of condition codes indicative of image quality.

9. Apparatus for monitoring quality for images of financial documents, the apparatus comprising:
    means for storing the images at an image sharing vendor;
    means for performing, at the image sharing vendor, a quality analysis of at least some of the images;
    means for identifying suspect images to a responsible customer bank over a network, the identifying being accomplished at the image sharing vendor based on results of the quality analysis; and
    means for recording at the image sharing vendor, for at least some of the images, a quality decisioning result received from the responsible customer bank over the network, the quality decisioning result being recorded in association with information identifying the images wherein the quality decisioning result is based on the result of the quality analysis.

10. The apparatus of claim 9 further comprising means for applying exclusion criteria to the images to select the at least some of the images for quality analysis.

11. The apparatus of claim 9 further comprising means for sending a quality results file to the responsible customer bank.

12. The apparatus of claim 11 further comprising means for receiving a decisioning results file from the responsible customer bank.

13. The apparatus of claim 10 further comprising means for sending a quality results file to the responsible customer bank.

14. The apparatus of claim 13 further comprising means for receiving a decisioning results file from the responsible customer bank.

15. A computer program product comprising a non-transitory computer readable medium including instructions for performing the method of claim 1.

16. A computer program product comprising a non-transitory computer readable medium including instructions for performing the method of claim 2.

17. A computer program product comprising a non-transitory computer readable medium including instructions for performing the method of claim 4.

18. A computer program product comprising a non-transitory computer readable medium including instructions for performing the method of claim 6.

19. A system for monitoring quality for centrally stored images of financial documents, the system comprising:
   a storage device operable to store the plurality of images at an image sharing vendor and to store databases at the image sharing vendor comprising information identifying the images;
   non-transitory computer program instructions executable at the image sharing vendor to cause the system to identify at least some images as subject to an image quality analysis; and
   non-transitory computer program instructions executable at the image sharing vendor to cause the system to perform the image quality analysis (IQA), identify suspect images to a responsible customer bank over a network and record a quality decisioning result received from the responsible customer bank over the network wherein the quality decisioning result is based on the result of the quality analysis.

20. The system of claim 19 further comprising:
   a landing zone for receiving the images.

21. The system of claim 19 wherein the computer program instructions to perform the IQA further cause the system to at least one of store, send, and receive files comprising:
   a quality results file that is sent to the responsible customer bank; and
   a decisioning results file that is received from the responsible customer bank.

22. The system of claim 20 wherein the computer program instructions to perform the IQA if further cause the system to at least one of store, send, and receive files comprising:
   a quality results file that is sent to the responsible customer bank; and
   a decisioning results file that is received from the responsible customer bank.

23. A computer readable memory system encoded with a results file for enabling quality monitoring for centrally stored images of financial documents, the results file comprising a plurality of records, each record corresponding to an image and further comprising:
   information identifying the image;
   a global image quality indicator having different values depending on whether the results file is a quality analysis results file from an image sharing vendor or a quality decisioning results file from a responsible customer bank; and
   a plurality of condition codes, each condition code related to a specific quality condition for the image, wherein a quality decisioning result in the quality decisioning results file is based on a quality analysis result in the quality analysis results file.

24. The computer readable memory system of claim 23 wherein the information identifying the image further comprises:
   a capture bank identifier;
   a paying bank identifier;
   a routing number; and
   an amount.

25. The computer readable memory system of claim 23 wherein the results file is a quality analysis results file and wherein the global image quality indicator indicates whether the image was tested and whether quality problems were detected.

26. The computer readable memory system of claim 23 wherein the results file is a quality decisioning results file and wherein the global image quality indicator indicates whether the image was accepted by an operator at a responsible customer bank.

27. The computer readable memory system of claim 24 wherein the results file is a quality analysis results file and wherein the global image quality indicator indicates whether the image was tested and whether quality problems were detected.

28. The computer readable memory system of claim 24 wherein the results file is a quality decisioning results file and wherein the global image quality indicator indicates whether the image was accepted by an operator at a responsible customer bank.

* * * * *